United States Patent

Demos

[11] Patent Number: 5,988,863
[45] Date of Patent: Nov. 23, 1999

[54] TEMPORAL AND RESOLUTION LAYERING IN ADVANCED TELEVISION

[75] Inventor: Gary E. Demos, Culver City, Calif.

[73] Assignee: DemoGraFX, Culver City, Calif.

[21] Appl. No.: 09/217,151

[22] Filed: Dec. 21, 1998

Related U.S. Application Data

[63] Continuation of application No. 08/594,815, Jan. 30, 1996, Pat. No. 5,852,565.

[51] Int. Cl.$^6$ ..................................................... G06F 17/00
[52] U.S. Cl. ......................................................... 364/715.02
[58] Field of Search ........................... 364/715.02, 514.2; 348/429, 447; 709/247

[56] References Cited

U.S. PATENT DOCUMENTS 5,465,119  11/1995  Demos ..................................... 348/447
5,852,565  12/1998  Demos ................................. 364/715.02

OTHER PUBLICATIONS

Aravind, R., et al., "Packet Loss Resilience of MPEG–2 Scalable Video Coding Algorithms", *IEEE Transactions on Circuits and Systems for Video Technology*, vol. 6, No. 5, pp. 426–435 (Oct. 1996).

Vincent, A., et al., "Spatial Prediction in Scalable Video Coding", *International Broadcasting Convention*, Publication No. 413, pp. 244–249 (Sep. 1995).

*Primary Examiner*—Ellis B. Ramirez
*Attorney, Agent, or Firm*—Fish & Richardson P.C.

[57] ABSTRACT

A method and apparatus for image compression which demonstrably achieves better than 1000-line resolution image compression at high frame rates with high quality. Image material is preferably captured at an initial or primary framing rate of 72 fps. An MPEG-2 data stream is then generated, comprising: (1) a base layer, preferably encoded using only MPEG-2 P frames, comprising a low resolution (e.g., 1024×512 pixels), low frame rate (24 or 36 Hz) bitstream; (2) an optional base resolution temporal enhancement layer, encoded using only MPEG-2 B frames, comprising a low resolution (e.g., 1024×512 pixels), high fi-e rate (72 Hz) bitstream; (3) an optional base temporal high resolution enhancement layer, preferably encoded using only MPEG-2 P frames, comprising a high resolution (e.g., 2k×1k pixels), low frame rate (24 or 36 Hz) bitstream; (4) an optional high resolution temporal enhancement layer, encoded using only MPEG-2 B frames, comprising a high resolution (e.g., 2k×1k pixels), high frame rate (72 Hz) bitstream. The invention can allocate all available bits to the lower resolution base layer when "stressful" image material is encountered. The invention provides replacement of numerous resolutions and frame rates with a single layered resolution and frame rate; eliminates interlace in order to achieve better than 1000-lines of resolution for 2 megapixel images at high frame rates (72 Hz) within a 6 MHz television channel; and is compatible with 72 Hz computer displays.

1 Claim, 8 Drawing Sheets

TEMPORAL AND RESOLUTION LAYERING IN ADVANCED TELEVISION

This application is a continuation of U.S. application Ser. No. 08/594,815, filed Jan. 30, 1996 now U.S. Pat. No. 5,852,565.

BACKGROUND OF THE INVENTION

1. Field of the Invention

This invention relates to electronic communication systems, and more particularly to an advanced electronic television system having temporal and resolution layering of compressed image frames.

2. Description of Related Art

The United States presently uses the NTSC standard for television transmissions. However, proposals have been made to replace the NTSC standard with an Advanced Television standard. For example, as of this writing, the Advisory Committee on Advanced Television Service (ACATS) is proposing that the U.S. adopt digital standard-definition and advanced television formats at rates of 24 Hz, 30 Hz, 60 Hz, and 60 Hz interlaced. It is apparent that these rates are intended to continue (and thus be compatible with) the existing NTSC television display rate of 60 Hz (or 59.94 Hz). It is also apparent that "3-2 pulldown" is intended for display on 60 Hz displays when presenting movies, which have a temporal rate of 24 frames per second (fps). However, while the ACATS proposal provides a menu of possible formats from which to select, each format only encodes and decodes a single resolution and frame rate. Because the display or motion rates of these formats are not integrally related to each other, conversion from one to another is difficult.

Further, the current ACATS proposal does not provide a crucial capability of compatibility with computer displays. These proposed image motion rates are based upon historical rates which date back to the early part of this century. If a "clean-slate" were to be made, it is unlikely that these rates would be chosen. In the computer industry, where displays could utilize any rate over the last decade, rates in the 70 to 80 Hz range have proven optimal, with 72 and 75 Hz being the most common rates. Unfortunately, the proposed ACATS rates of 30 and 60 Hz lack useful interoperability with 72 or 75 Hz, resulting in degraded temporal performance.

In addition, it is being suggested by some in the field that frame interlace is required, due to a claimed need to have about 1000 lines of resolution at high frame rates, but based upon the notion that such images cannot be compressed within the available 18–19 mbits/second of a conventional 6 MHz broadcast television channel.

It would be much more desirable if a single signal format were to be adopted, containing within it all of the desired standard and high definition resolutions. However, to do so within the bandwidth constraints of a conventional 6 MHz broadcast television channel requires compression (or "scalability") of both frame rate (temporal) and resolution (spatial). One method specifically intended to provide for such scalability is the MPEG-2 standard. Unfortunately, the temporal and spatial scalability features specified within the MPEG-2 standard are not sufficiently efficient to accommodate the needs of advanced television for the U.S. Thus, the current ACATS proposal for advanced television for the U.S. is based upon the premise that temporal (frame rate) and spatial (resolution) layering are inefficient, and therefore discrete formats are necessary.

The present invention overcomes these and other problems of the ACATS proposal.

SUMMARY OF THE INVENTION

The present invention provides a method and apparatus for image compression which demonstrably achieves better than 1000-line resolution image compression at high frame rates with high quality. It also achieves both temporal and resolution scalability at this resolution at high frame rates within the available bandwidth of a conventional television broadcast channel. The inventive technique efficiently achieves over twice the compression ratio being proposed by ACATS for advanced television.

Image material is preferably captured at an initial or primary framing rate of 72 fps. An MPEG-2 data stream is then generated, comprising:

(1) a base layer, preferably encoded using only MPEG-2 P frames, comprising a low resolution (e.g., 1024×512 pixels), low frame rate (24 or 36 Hz) bitstream;

(2) an optional base resolution temporal enhancement layer, encoded using only MPEG-2 B frames, comprising a low resolution (e.g., 1024×512 pixels), high frame rate (72 Hz) bitstream;

(3) an optional base temporal high resolution enhancement layer, preferably encoded using only MPEG-2 P frames, comprising a high resolution (e.g., 2k×1k pixels), low frame rate (24 or 36 Hz) bitstream;

(4) an optional high resolution temporal enhancement layer, encoded using only MPEG-2 B frames, comprising a high resolution (e.g., 2k×1k pixels), high frame rate (72 Hz) bitstream.

The invention provides a number of key technical attributes, allowing substantial improvement over the ACATS proposal, and including: replacement of numerous resolutions and frame rates with a single layered resolution and frame rate; no need for interlace in order to achieve better than 1000-lines of resolution for 2 megapixel images at high frame rates (72 Hz) within a 6 MHz television channel; compatibility with computer displays through use of a primary framing rate of 72 fps; and greater robustness than the current unlayered ACATS format proposal for advanced television, since all available bits may be allocated to a lower resolution base layer when "stressful" image material is encountered.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Figure 1:
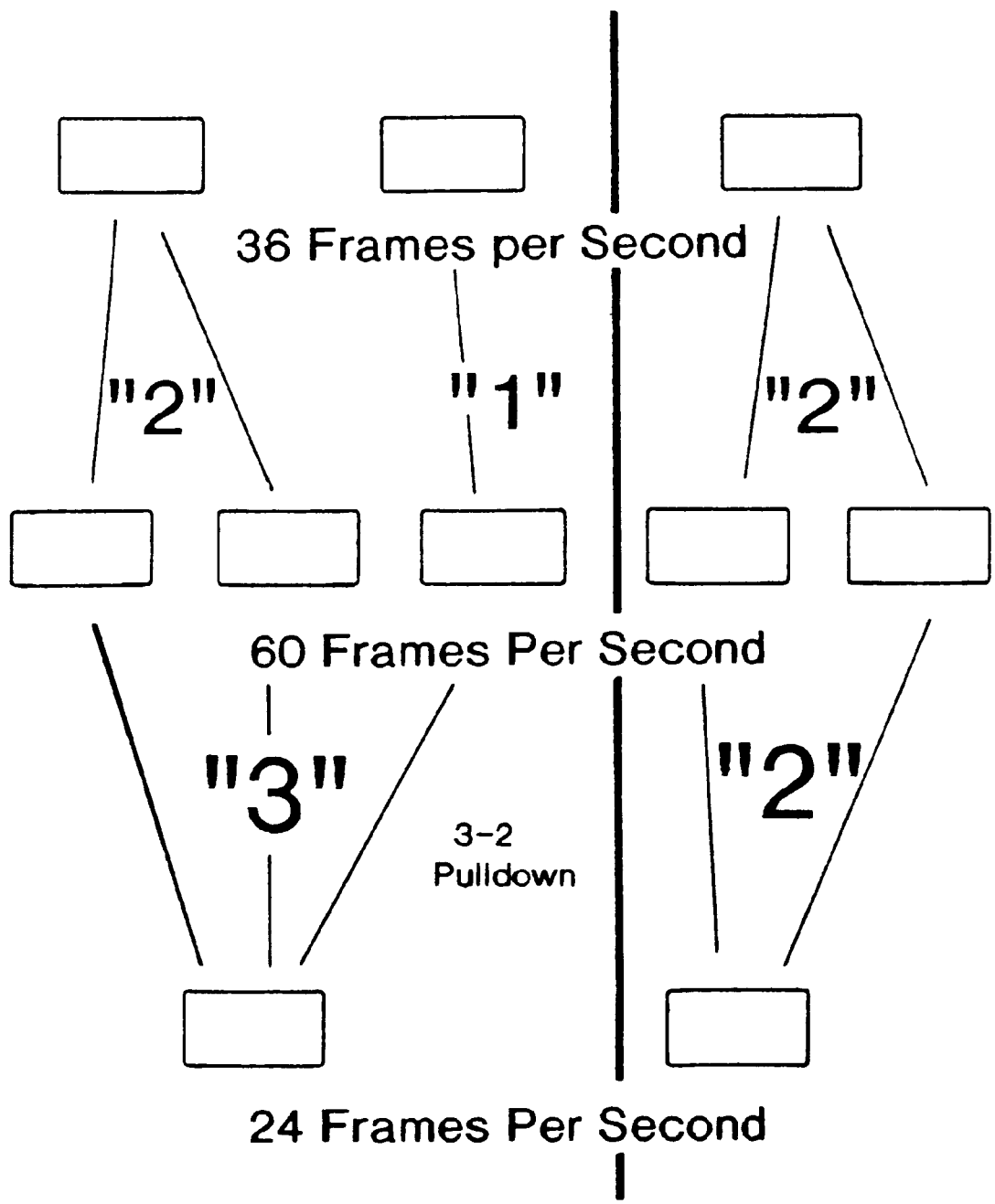
FIG. 1 is a timing diagram showing the pulldown rates for 24 fps and 36 fps material to be displayed at 60 Hz.

Throughout this description, the preferred embodiment and examples shown should be considered as exemplars, rather than as limitations on the present invention.

Goals Of A Temporal Rate Family

After considering the problems of the prior art, and in pursuing the present invention, the following goals were defined for specifying the temporal characteristics of a future digital television system:

Optimal presentation of the high resolution legacy of 24 frame-per-second films.

Smooth motion capture for rapidly moving image types, such as sports.

Smooth motion presentation of sports and similar images on existing analog NTSC displays, as well as computer-compatible displays operating at 72 or 75 Hz.

Reasonable but more efficient motion capture of less-rapidly-moving images, such as news and live drama.

Reasonable presentation of all new digital types of images through a converter box onto existing NTSC displays.

High quality presentation of all new digital types of images on computer-compatible displays.

If 60 Hz digital standard or high resolution displays come into the market, reasonable or high quality presentation on these displays as well.

Since 60 Hz and 72/75 Hz displays are fundamentally incompatible at any rate other than the movie rate of 24 Hz, the best situation would be if either 72/75 or 60 were eliminated as a display rate. Since 72 or 75 Hz is a required rate for N.I.I. (National Information Infrastructure) and computer applications, elimination of the 60 Hz rate as being fundamentally obsolete would be the most future-looking. However, there are many competing interests within the broadcasting and television equipment industries, and there is a strong demand that any new digital television infrastructure be based on 60 Hz (and 30 Hz). This has lead to much heated debate between the television, broadcast, and computer industries.

Further, the insistence by some interests in the broadcast and television industries on interlaced 60 Hz formats further widens the gap with computer display requirements. Since non-interlaced display is required for computer-like applications of digital television systems, a de-interlacer is required when interlaced signals are displayed. There is substantial debate about the cost and quality of de-interlacers, since they would be needed in every such receiving device. Frame rate conversion, in addition to de-interlacing, further impacts cost and quality. For example, NTSC to-from PAL converters continue to be very costly and yet conversion performance is not dependable for many common types of scenes. Since the issue of interlace is a complex and problematic subject, and in order to attempt to address the problems and issue of temporal rate, the invention is described in the context of a digital television standard without interlace.

Selecting Optimal Temporal Rates

Beat Problems. Optimal presentation on a 72 or 75 Hz display will occur if a camera or simulated image is created having a motion rate equal to the display rate (72 or 75 Hz, respectively), and vice versa. Similarly, optimal motion fidelity on a 60 Hz display will result from a 60 Hz camera or simulated image. Use of 72 Hz or 75 Hz generation rates with 60 Hz displays results in a 12 Hz or 15 Hz beat frequency, respectively. This beat can be removed through motion analysis, but motion analysis is expensive and inexact, often leading to visible artifacts and temporal aliasing. In the absence of motion analysis, the beat frequency dominates the perceived display rate, making the 12 or 15 Hz beat appear to provide less accurate motion than even 24 Hz. Thus, 24 Hz forms a natural temporal common denominator between 60 and 72 Hz. Although 75 Hz has a slightly higher 15 Hz beat with 60 Hz, its motion is still not as smooth as 24 Hz, and there is no integral relationship between 75 Hz and 24 Hz unless the 24 Hz rate is increased to 25 Hz. (In European 50 Hz countries, movies are often played 4% fast at 25 Hz; this can be done to make film presentable on 75 Hz displays.)

In the absence of motion analysis at each receiving device, 60 Hz motion on 72 or 75 Hz displays, and 75 or 72 Hz motion on 60 Hz displays, will be less smooth than 24 Hz images. Thus, neither 72/75 Hz nor 60 Hz motion is suitable for reaching a heterogeneous display population containing both 72 or 75 Hz and 60 Hz displays.

3-2 Pulldown. A further complication in selecting an optimal frame rate occurs due to the use of "3-2 pulldown" combined with video effects during the telecine (film-to-video) conversion process. During such conversions, the 3-2 pulldown pattern repeats a first frame (or field) 3 times, then the next frame 2 times, then the next frame 3 times, then the next frame 2 times, etc. This is how 24 fps film is presented on television at 60 Hz (actually, 59.94 Hz for NTSC color). That is, each of 12 pairs of 2 frames in one second of film is displayed 5 times, giving 60 images per second. The 3-2 pulldown pattern is shown in FIG. 1.

By some estimates, more than half of all film on video has substantial portions where adjustments have been made at the 59.94 Hz video field rate to the 24 fps film. Such adjustments include "pan-and-scan", color correction, and title scrolling. Further, many films are time-adjusted by dropping frames or clipping the starts and ends of scenes to fit within a given broadcast scheduled. These operations can make the 3-2 pulldown process impossible to reverse, since there is both 59.94 Hz and 24 Hz motion. This can make the film very difficult to compress using the MPEG-2 standard. Fortunately, this problem is limited to existing NTSC-resolution material, since there is no significant library of higher resolution digital film using 3-2 pulldown.

Motion Blur. In order to further explore the issue of finding a common temporal rate higher than 24 Hz, it is useful to mention motion blur in the capture of moving images. Camera sensors and motion picture film are open to sensing a moving image for a portion of the duration of each frame. On motion picture cameras and many video cameras, the duration of this exposure is adjustable. Film cameras require a period of time to advance the film, and are usually limited to being open only about 210 out of 360 degrees, or a 58% duty cycle. On video cameras having CCD sensors, some portion of the frame time is often required to "read" the image from the sensor. This can vary from 10% to 50% of the frame time. In some sensors, an electronic shutter must be used to blank the light during this readout time.

Thus, the "duty cycle" of CCD sensors usually varies from 50 to 90%, and is adjustable in some cameras. The light shutter can sometimes be adjusted to further reduce the duty cycle, if desired. However, for both film and video, the most common sensor duty cycle duration is 50%.

Preferred Rate. With this issue in mind, one can consider the use of only some of the frames from an image sequence captured at 60, 72, or 75 Hz. Utilizing one frame in two, three, four, etc., the subrates shown in TABLE 1 can be derived.

TABLE 1

| Rate | ½ Rate | ⅓ Rate | ¼ Rate | ⅕ Rate | ⅙ Rate |
|------|--------|--------|--------|--------|--------|
| 75 Hz | 37.5 | 25 | 18.25 | 15 | 12.5 |
| 72 Hz | 36 | 24 | 18 | 14.4 | 12 |
| 60 Hz | 30 | 20 | 15 | 12 | 10 |

The rate of 15 Hz is a unifying rate between 60 and 75 Hz. The rate of 12 Hz is a unifying rate between 60 and 72 Hz. However, the desire for a rate above 24 Hz eliminates these rates. 24 Hz is not common, but the use of 3-2 pulldown has come to be accepted by the industry for presentation on 60 Hz displays. The only candidate rates are therefore 30, 36, and 37.5 Hz. Since 30 Hz has a 7.5 Hz beat with 75 Hz, and a 6 Hz beat with 72 Hz, it is not useful as a candidate.

The motion rates of 36 and 37.5 Hz become prime candidates for smoother motion than 24 Hz material when presented on 60 and 72/75 Hz displays. Both of these rates are about 50% faster and smoother than 24 Hz. The rate of 37.5 Hz is not suitable for use with either 60 or 72 Hz, so it must be eliminated, leaving only 36 Hz as having the desired temporal rate characteristics. (The motion rate of 37.5 Hz could be used if the 60 Hz display rate for television can be move 4% to 62.5 Hz. Given the interests behind 60 Hz, 62.5 Hz appears unlikely—there are even those who propose the very obsolete 59.94 Hz rate for new television systems. However, if such a change were to be made, the other aspects of the present invention could be applied to the 37.5 Hz rate.)

The rates of 24, 36, 60, and 72 Hz are left as candidates for a temporal rate family. The rates of 72 and 60 Hz cannot be used for a distribution rate, since motion is less smooth when converting between these two rates than if 24 Hz is used as the distribution rate, as described above. By hypothesis, we are looking for a rate faster than 24 Hz. Therefore, 36 Hz is the prime candidate for a master, unifying motion capture and image distribution rate for use with 60 and 72/75 Hz displays.

As noted above, the 3-2 pulldown pattern for 24 Hz material repeats a first frame (or field) 3 times, then the next frame 2 times, then the next frame 3 times, then the next frame 2 times, etc. When using 36 Hz, each pattern optimally should be repeated in a 2-1-2 pattern. This can be seen in TABLE 2 and graphically in FIG. 1.

TABLE 2

| Rate | Frame Numbers | | | | | | | | | |
|------|---|---|---|---|---|---|---|---|---|---|
| 60 Hz | 1 | 2 | 3 | 4 | 5 | 6 | 7 | 8 | 9 | 10 |
| 24 Hz | 1 | 1 | 1 | 2 | 2 | 3 | 3 | 3 | 4 | 4 |
| 36 Hz | 1 | 1 | 2 | 3 | 3 | 4 | 4 | 5 | 6 | 6 |

This relationship between 36 Hz and 60 Hz only holds for true 36 Hz material. 60 Hz material can be "stored" in 36 Hz, if it is interlaced, but 36 Hz cannot reasonably be created from 60 Hz without motion analysis and reconstruction. However, in looking for a new rate for motion capture, 36 Hz provides slightly smoother motion on 60 Hz than does 24 Hz, and provides substantially better image motion smoothness on a 72 Hz display. Therefore, 36 Hz is the optimum rate for a master, unifying motion capture and image distribution rate for use with 60 and 72 Hz displays, yielding smoother motion than 24 Hz material presented on such displays.

Although 36 Hz meets the goals set forth above, it is not the only suitable capture rate. Since 36 Hz cannot be simply extracted from 60 Hz, 60 Hz does not provide a suitable rate for capture. However, 72 Hz can be used for capture, with every other frame then used as the basis for 36 Hz distribution. The motion blur from using every other frame of 72 Hz material will be half of the motion blur at 36 Hz capture. Tests of motion blur appearance of every third frame from 72 Hz show that staccato strobing at 24 Hz is objectionable. However, utilizing every other frame from 72 Hz for 36 Hz display is not objectionable to the eye compared to 36 Hz native capture.

Thus, 36 Hz affords the opportunity to provide very smooth motion on 72 Hz displays by capturing at 72 Hz, while providing better motion on 60 Hz displays than 24 Hz material by using alternate frames of 72 Hz native capture material to achieve a 36 Hz distribution rate and then using 2-1-2 pulldown to derive a 60 Hz image.

In summary, TABLE 3 shows the preferred optimal temporal rates for capture and distribution in accordance with the present invention.

TABLE 3

| | Preferred Rates | | |
|---|---|---|---|
| Capture | Distribution | Optimal Display | Acceptable Display |
| 72 Hz | 36 Hz + 36 Hz | 72 Hz | 60 Hz |

It is also worth noting that this technique of utilizing alternate frames from a 72 Hz camera to achieve a 36 Hz distribution rate can profit from an increased motion blur duty cycle. The normal 50% duty cycle at 72 Hz, yielding a 25% duty cycle at 36 Hz, has been demonstrated to be acceptable, and represents a significant improvement over 24 Hz on 60 Hz and 72 Hz displays. However, if the duty cycle is increased to be in the 75–90% range, then the 36 Hz samples would begin to approach the more common 50% duty cycle. Increasing the duty rate may be accomplished, for example, by using "backing store" CCD designs which have a short blanking time, yielding a high duty cycle. Other methods may be used, including dual CCD multiplexed designs.

Modified MPEG2 Compression

For efficient storage and distribution, digital source material having the preferred temporal rate of 36 Hz should be compressed. The preferred form of compression for the present invention is accomplished by using a novel variation of the MPEG-2 standard. MPEG-2 Basics. MPEG-2 is an international video compression standard defining a video syntax that provides an efficient way to represent image sequences in the form of more compact coded data. The language of the coded bits is the "syntax." For example, a few tokens can represent an entire block of 64 samples. MPEG also describes a decoding (reconstruction) process where the coded bits are mapped from the compact representation into the original, "raw" format of the image sequence. For example, a flag in the coded bitstream signals whether the following bits are to be decoded with a discrete cosine transform (DCT) algorithm or with a prediction algorithm. The algorithms comprising the decoding process are regulated by the semantics defined by MPEG. This syntax can be applied to exploit common video characteristics such as spatial redundancy, temporal redundancy, uniform motion, spatial masking, etc. In effect, MPEG-2 defines a programming language as well as a data format. An MPEG-2 decoder must be able to parse and decode an incoming data stream, but so long as the data stream complies with the MPEG-2 syntax, a wide variety of possible data structures and compression techniques can be used. The present invention takes advantage of this flexibility by devising a novel means and method for temporal and resolution scaling using the MPEG-2 standard.

MPEG-2 uses an intraframe and an interframe method of compression. In most video scenes, the background remains relatively stable while action takes place in the foreground. The background may move, but a great deal of the scene is redundant. MPEG-2 starts its compression by creating a reference frame called an I (for Intra) frame. I frames are compressed without reference to other frames and thus contain an entire frame of video information. I frames provide entry points into a data bitstream for random access, but can only be moderately compressed. Typically, the data representing I frames is placed in the bitstream every 10 to 15 frames. Thereafter, since only a small portion of the frames that fall between the reference I frames are different from the bracketing I frames, only the differences are captured, compressed and stored. Two type of frames are used for such differences—P (for Predicted) frames and B (for Bi-directional Interpolated) frames.

P frames generally are encoded with reference to a past frame (either an I frame or a previous P frame), and, in general, will be used as a reference for future P frames. P frames receive a fairly high amount of compression. B frames pictures provide the highest amount of compression but generally require both a past and a future reference in order to be encoded. Bi-directional frames are never used for reference frames. Macroblocks within P frames may also be individually encoded using intra-frame coding. Macroblocks within B frames may also be individually encoded using intra-frame coding, forward predicted coding, backward predicted coding, or both forward and backward, or bi-directionally interpolated, predicted coding. A macroblock is a 16×16 pixel grouping of four 8×8 DCT blocks, together with one motion vector for P frames, and one or two motion vectors for B frames.

After coding, an MPEG data bitstream comprises a sequence of I, P, and B frames. A sequence may consist of almost any pattern of I, P, and B frames (there are a few minor semantic restrictions on their placement). However, it is common in industrial practice to have a fixed pattern (e.g., IBBPBBPBBPBBPBB).

As an important part of the present invention, an MPEG-2 data stream is created comprising a base layer, at least one optional temporal enhancement layer, and an optional resolution enhancement layer. Each of these layers will be described in detail.

Temporal Scalability

Base Layer. The base layer is used to carry 36 Hz source material. In the preferred embodiment, one of two MPEG-2 frame sequences can be used for the base layer: IBPBPBP or IPPPPPP. The latter pattern is most preferred, since the decoder would only need to decode P frames, reducing the required memory bandwidth if 24 Hz movies were also decoded without B frames.

Figure 2:
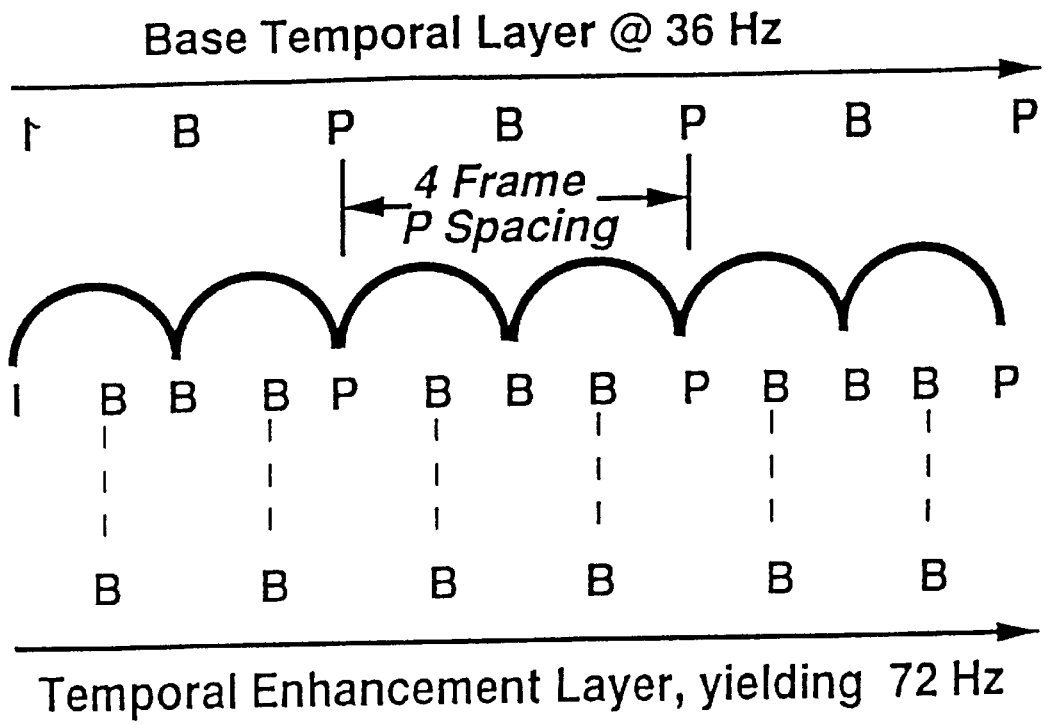
FIG. 2 is a first preferred MPEG-2 coding pattern.
Figure 3:
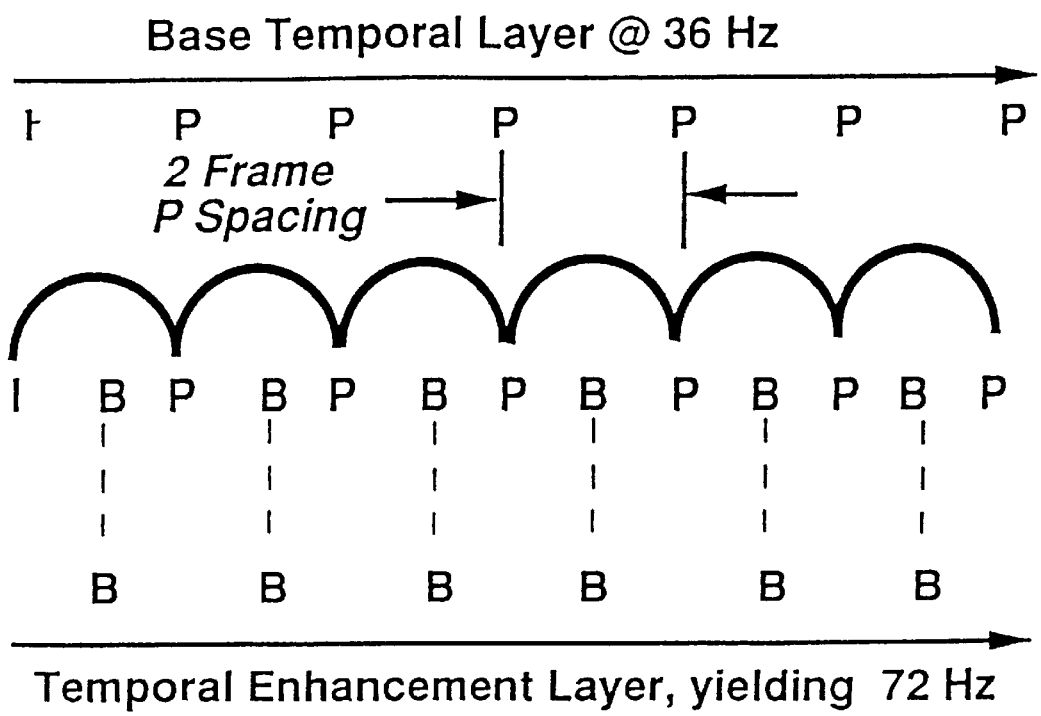
FIG. 3 is a second preferred MPEG-2 coding pattern.

72 Hz Temporal Enhancement Layer. When using MPEG-2 compression, it is possible to embed a 36 Hz temporal enhancement layer as B frames within the MPEG-2 sequence for the 36 Hz base layer if the P frame distance is even. This allows the single data stream to support both 36 Hz display and 72 Hz display. For example, both layers could be decoded to generate a 72 Hz signal for computer monitors, while only the base layer might be decoded and converted to generate a 60 Hz signal for television. In the preferred embodiment, the MPEG-2 coding patterns of IPBBBPBBBPBBBP or IPBPBPBPB both allow placing alternate frames in a separate stream containing only temporal enhancement B frames to take 36 Hz to 72 Hz. These coding patterns are shown in FIGS. 2 and 3, respectively. The 2-Frame P spacing coding pattern of FIG. 3 has the added advantage that the 36 Hz decoder would only need to decode P frames, reducing the required memory bandwidth if 24 Hz movies were also decoded without B frames.

Figure 4:
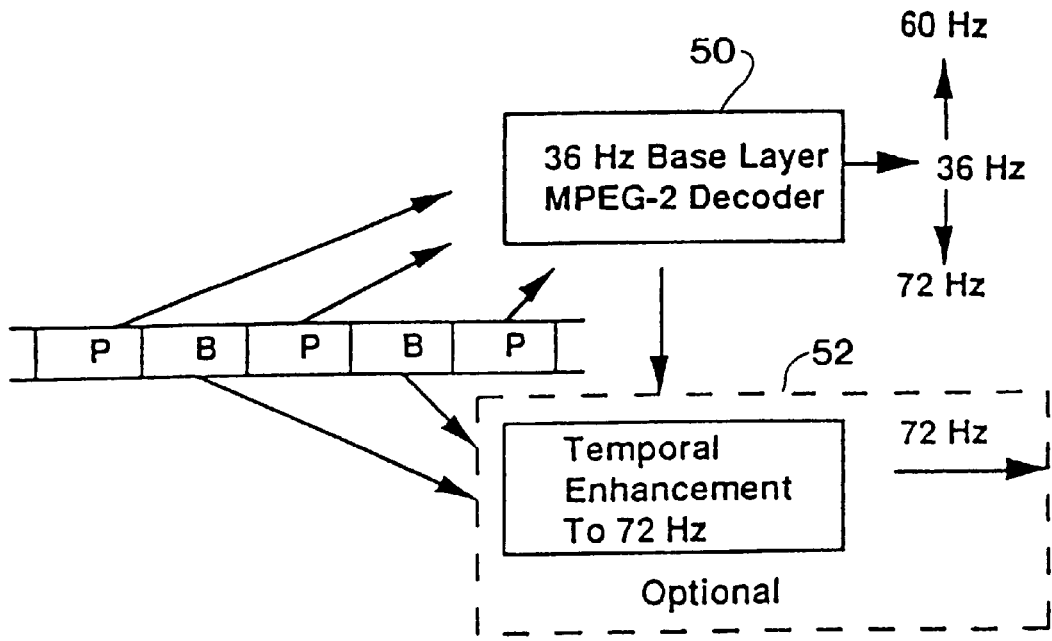
FIG. 4 is a block diagram showing temporal layer decoding in accordance with the preferred embodiment of the present invention.

Experiments with high resolution images have suggested that the 2-Frame P spacing of FIG. 3 is optimal for most types of images. That is, the construction in FIG. 3 appears to offer the optimal temporal structure for supporting both 60 and 72 Hz, while providing excellent results on modem 72 Hz computer-compatible displays. This construction allows two digital streams, one at 36 Hz for the base layer, and one at 36 Hz for the enhancement layer B frames to achieve 72 Hz. This is illustrated in FIG. 4, which is a block diagram showing that a 36 Hz base layer MPEG-2 decoder 50 simply decodes the P frames to generate 36 Hz output, which may then be readily converted to either 60 Hz or 72 Hz display. An optional second decoder 52 simply decodes the B frames to generate a second 36 Hz output, which when combined with the 36 Hz output of the base layer decoder 50 results in a 72 Hz output (a method for combining is discussed below). In an alternative embodiment, one fast MPEG-2 decoder 50 could decode both the P frames for the base layer and the B frames for the enhancement layer.

Optimal Master Format. A number of companies are building MPEG-2 decoding chips which operate at around 11 MPixels/second. The MPEG-2 standard has defined some "profiles" for resolutions and frame rates. Although these profiles are strongly biased toward computer-incompatible format parameters such as 60 Hz, non-square pixels, and interlace, many chip manufacturers appear to be developing decoder chips which operate at the "main profile, main level". This profile is defined to be any horizontal resolution up to 720 pixels, any vertical resolution up to 576 lines at up to 25 Hz, and any frame rate of up to 480 lines at up to 30 Hz. A wide range of data rates from approximately 1.5 Mbits/second to about 10 Mbits/second is also specified. However, from a chip point of view, the main issue is the rate at which pixels are decoded. The main-level, main-profile pixel rate is about 10.5 MPixels/second.

Although there is variation among chip manufacturers, most MPEG-2 decoder chips will in fact operate at up to 13 MPixels/second, given fast support memory. Some decoder chips will go as fast as 20 MPixels/second or more. Given that CPU chips tend to gain 50% improvement or more each year at a given cost, one can expect some near-term flexibility in the pixel rate of MPEG-2 decoder chips.

TABLE 4 illustrates some desirable resolutions and frame rates, and their corresponding pixel rates.

TABLE 4

| Resolution | | Frame Rate | Pixel Rate |
|---|---|---|---|
| X | Y | (Hz) | (MPixels/s) |
| 640 | 480 | 36 | 11.1 |
| 720 | 486 | 36 | 12.6 |
| 720 | 486 | 30 (for comparison) | 10.5 |
| 704 | 480 | 36 | 12.2 |
| 704 | 480 | 30 (for comparison) | 10.1 |
| 680 | 512 | 36 | 12.5 |
| 1024 | 512 | 24 | 12.6 |

All of these formats can be utilized with MPEG-2 decoder chips that can generate at least 12.6 MPixels/second. The very desirable 640×480 at 36 Hz format can be achieved by nearly all current chips, since its rate is 11.1 MPixels/second. A widescreen 1024×512 image can be squeezed into 680×512 using a 1.5:1 squeeze, and can be supported at 36 Hz if 12.5 MPixels/second can be handled. The highly desirable square pixel widescreen template of 1024×512 can achieve 36 Hz when MPEG-2 decoder chips can process about 18.9 MPixels/second. This becomes more feasible if 24 Hz and 36 Hz material is coded only with P frames, such that B frames are only required in the 72 Hz temporal enhancement layer decoders. Decoders which use only P frames require less memory and memory bandwidth, making the goal of 19 MPixels/second more accessible.

The 1024×512 resolution template would most often be used with 2.35:1 and 1.85:1 aspect ratio films at 24 fps. This material only requires 11.8 MPixels/second, which should fit within the limits of most existing main level-main profile decoders.

Figure 6:
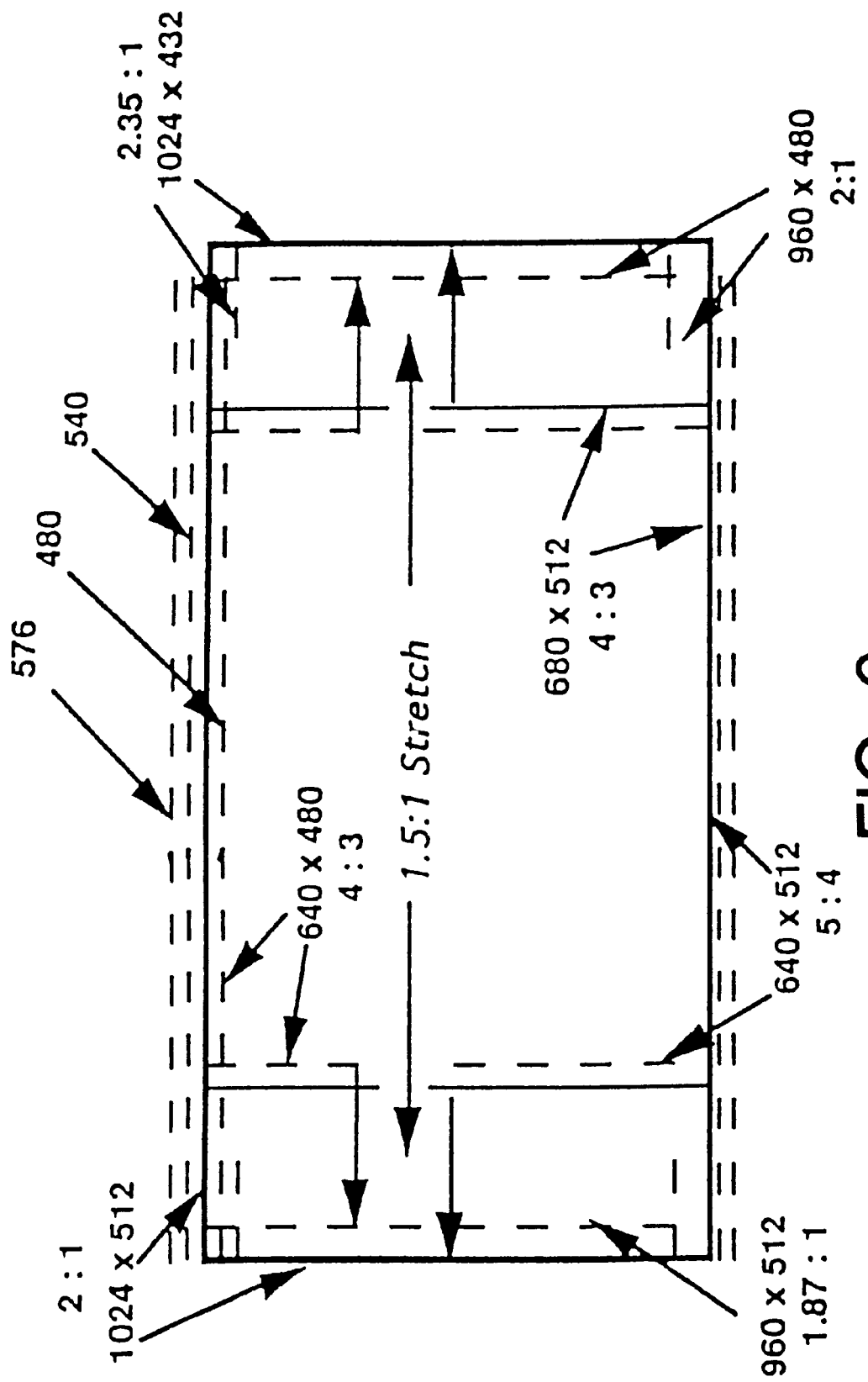
FIG. 6 is a diagram showing a "master template" for a base MPEG-2 layer at 24 or 36 Hz.

All of these formats are shown in FIG. 6 in a "master template" for a base layer at 24 or 36 Hz. Accordingly, the present invention provides a unique way of accommodating a wide variety of aspect ratios and temporal resolution compared to the prior art. (Further discussion of a master template is set forth below).

The temporal enhancement layer of B frames to generate 72 Hz can be decoded using a chip with double the pixel rates specified above, or by using a second chip in parallel with additional access to the decoder memory. Under the present invention, at least two ways exist for merging of the enhancement and base layer data streams to insert the alternate B frames. First, merging can be done invisibly to the decoder chip using the MPEG-2 transport layer. The MPEG-2 transport packets for two PIDs (Program IDs) can be recognized as containing the base layer and enhancement layer, and their stream contents can both be simply passed on to a double-rate capable decoder chip, or to an appropriately configured pair of normal rate decoders. Second, it is also possible to use the "data partitioning" feature in the MPEG-2 data stream instead of the transport layer from MPEG-2 systems. The data partitioning feature allows the B frames to be marked as belonging to a different class within the MPEG-2 compressed data stream, and can therefore be flagged to be ignored by 36-Hz decoders which only support the temporal base layer rate.

Temporal scalability, as defined by MPEG-2 video compression, is not as optimal as the simple B frame partitioning of the present invention. The MPEG-2 temporal scalability is only forward referenced from a previous P or B frame, and thus lacks the efficiency available in the B frame encoding proposed here, which is both forward and backward referenced. Accordingly, the simple use of B frames as a temporal enhancement layer provides a simpler and more efficient temporal scalability than does the temporal scalability defined within MTEG-2. Notwithstanding, this use of B frames as the mechanism for temporal scalability is fully compliant with MPEG-2. The two methods of identifying these B frames as an enhancement layer, via data partitioning or alternate PID's for the B frames, are also fuilly compliant.

50/60 Hz Temporal enhancement layer. In addition to, or as an alternative to, the 72 Hz temporal enhancement layer described above (which encodes a 36 Hz signal), a 60 Hz temporal enhancement layer (which encodes a 24 Hz signal) can be added in similar fashion to the 36 Hz base layer. A 60 Hz temporal enhancement layer is particular useful for encoding existing 60 Hz interlaced video material.

Most existing 60 Hz interlaced material is video tape for NTSC in analog, D1, or D2 format. There is also a small amount of Japanese HDTV (SMPTE 240/260M). There are also cameras which operate in this format. Any such 60 Hz interlaced format can be processed in known fashion such that the signal is de-interlaced and frame rate converted. This process involves very complex image understanding technology, similar to robot vision. Even with very sophisticated technology, temporal aliasing generally will result in "misunderstandings" by the algorithm and occasionally yield artifacts. Note that the typical 50% duty cycle of image capture means that the camera is "not looking" half the time. The "backwards wagon wheels" in movies is an example of temporal aliasing due to this normal practice of temporal undersampling. Such artifacts generally cannot be removed without human-assisted reconstruction. Thus, there will always be cases which cannot be automatically corrected. However, the motion conversion results available in current technology should be reasonable on most material.

Figure 5:
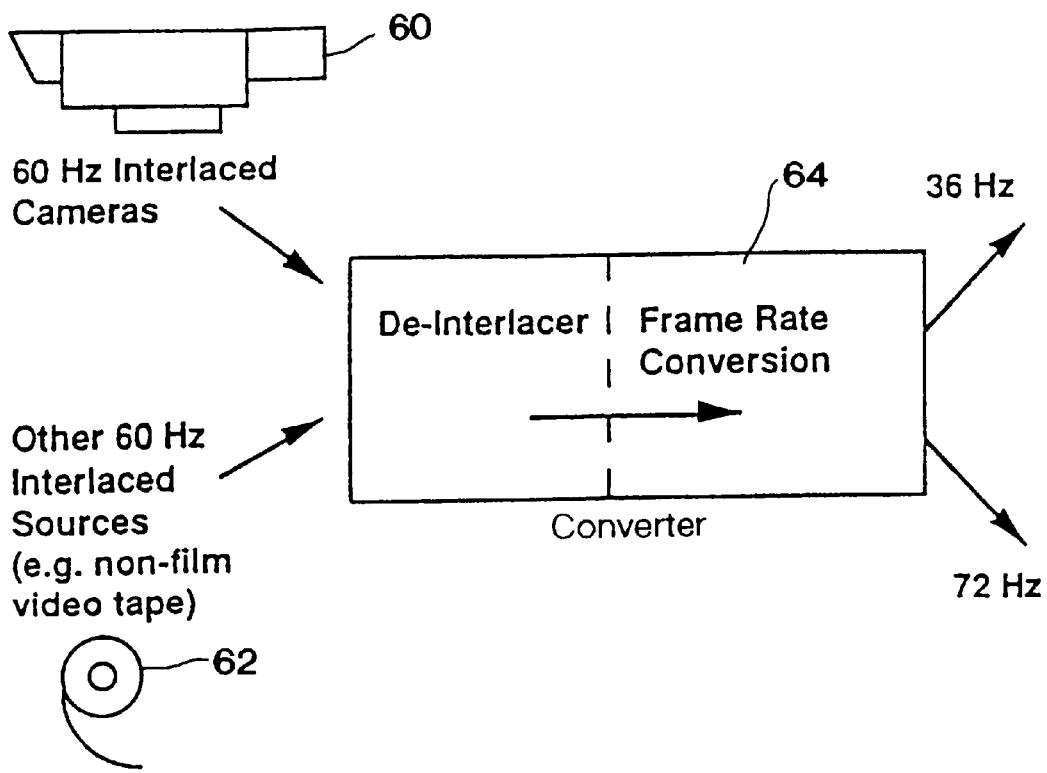
FIG. 5 is a block diagram showing 60 Hz interlaced input to a converter that can output both 36 Hz and 72 Hz frames.

The price of a single high definition camera or tape machine would be similar to the cost of such a converter. Thus, in a studio having several cameras and tape machines, the cost of such conversion becomes modest. However, performing such processing adequately is presently beyond the budget of home and office products. Thus, the complex processing to remove interlace and convert the frame rate for existing material is preferably accomplished at the origination studio. This is shown in FIG. 5, which is a block diagram showing 60 Hz interlaced input from cameras 60 or other sources (such as non-film video tape) 62 to a converter 64 that includes a de-interlacer function and a frame rate conversion function that can output a 36 Hz signal (36 Hz base layer only) and a 72 Hz signal (36 Hz base layer plus 36 Hz from the temporal enhancement layer).

As an alternative to outputting a 72 Hz signal (36 Hz base layer plus 36 Hz from the temporal enhancement layer), this conversion process can be adapted to produce a second MPEG-2 24 Hz temporal enhancement layer on the 36 Hz base layer which would reproduce the original 60 Hz signal, although de-interlaced. If similar quantization is used for the 60 Hz temporal enhancement layer B frames, the data rate should be slightly less than the 72 Hz temporal enhancement layer, since there are fewer B frames.

The vast majority of material of interest to the United States is low resolution NTSC. At present, most NTSC signals are viewed with substantial impairment on most home televisions. Further, viewers have come to accept the temporal impairments inherent in the use of 3-2 pulldown to present film on television. Nearly all prime-time television is made on film at 24 frames per second. Thus, only sports, news, and other video-original shows need be processed in this fashion. The artifacts and losses associated with converting these shows to a 36/72 Hz format are likely to be offset by the improvements associated with high-quality de-interlacing of the signal.

Note that the motion blur inherent in the 60 Hz (or 59.94 Hz) fields should be very similar to the motion blur in 72 Hz frames. Thus, this technique of providing a base and enhancement layer should appear similar to 72 Hz origination in terms of motion blur. Accordingly, few viewers will notice the difference, except possibly as a slight improvement, when interlaced 60 Hz NTSC material is processed into a 36 Hz base layer, plus 24 Hz from the temporal enhancement layer, and displayed at 60 Hz. However, those who buy new 72 Hz digital non-interlaced televisions will notice a small improvement when viewing NTSC, and a major improvement when viewing new material captured or originated at 72 Hz. Even the decoded 36 Hz base layer presented on 72 Hz displays will look as good as high quality digital NTSC, replacing interlace artifacts with a slower frame rate.

The same process can also be applied to the conversion of existing PAL 50 Hz material to a second MPEG-2 enhancement layer. PAL video tapes are best slowed to 48 Hz prior to such conversion. Live PAL requires conversion using the relatively unrelated rates of 50, 36, and 72 Hz. Such converter units presently are only affordable at the source of broadcast signals, and are not presently practical at each receiving device in the home and office.

Resolution Scalability

Figure 7:
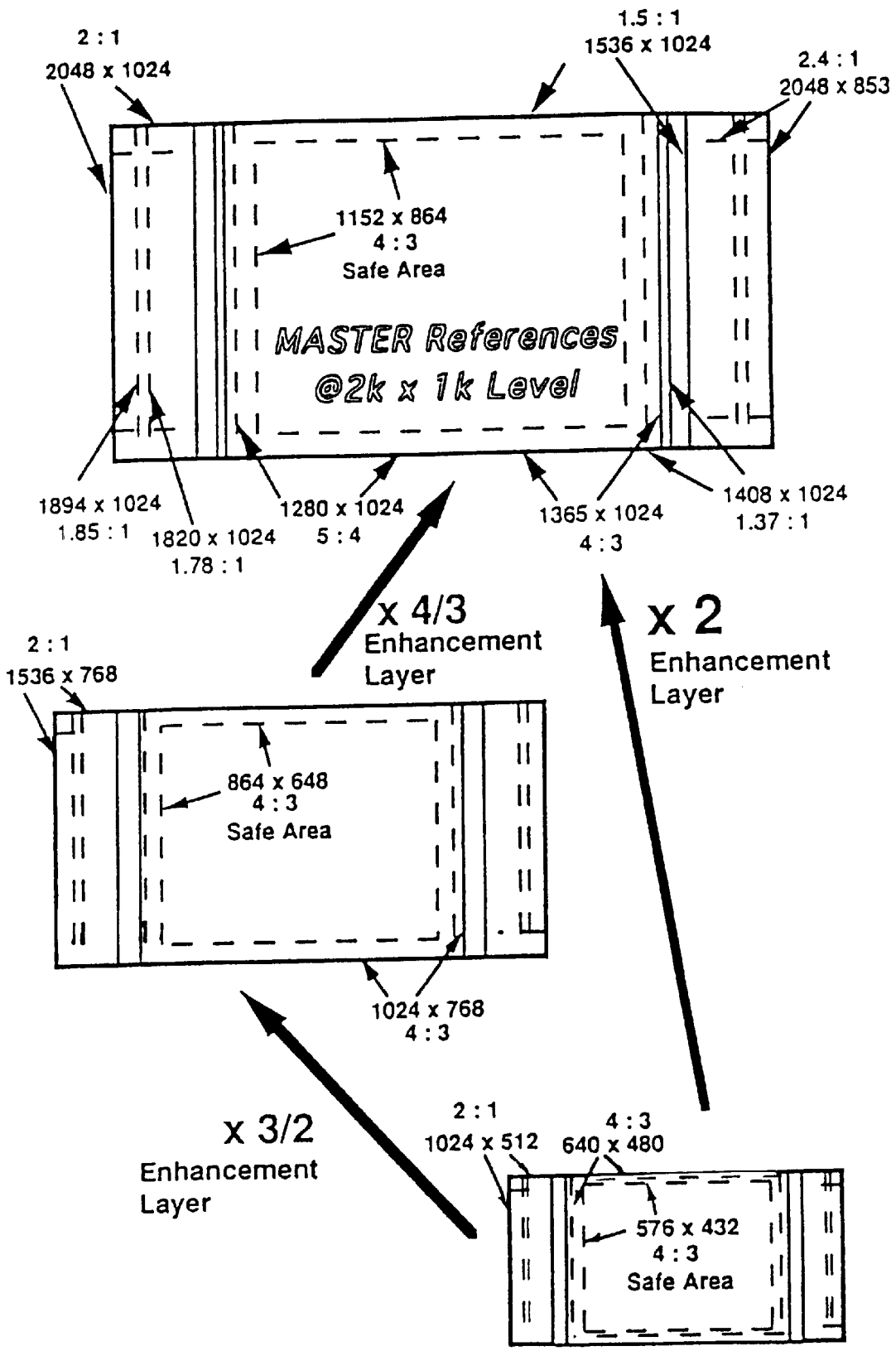
FIG. 7 is a diagram showing enhancement of a base resolution template using hierarchical resolution scalability utilizing MPEG-2.

It is possible to enhance the base resolution template using hierarchical resolution scalability utilizing MPEG-2 to achieve higher resolutions built upon a base layer. Use of enhancement can achieve resolutions at 1.5× and 2× the base layer. Double resolution can be built in two steps, by using 3/2 then 4/3, or it can be a single factor-of-two step. This is shown in FIG. 7.

Figure 8:
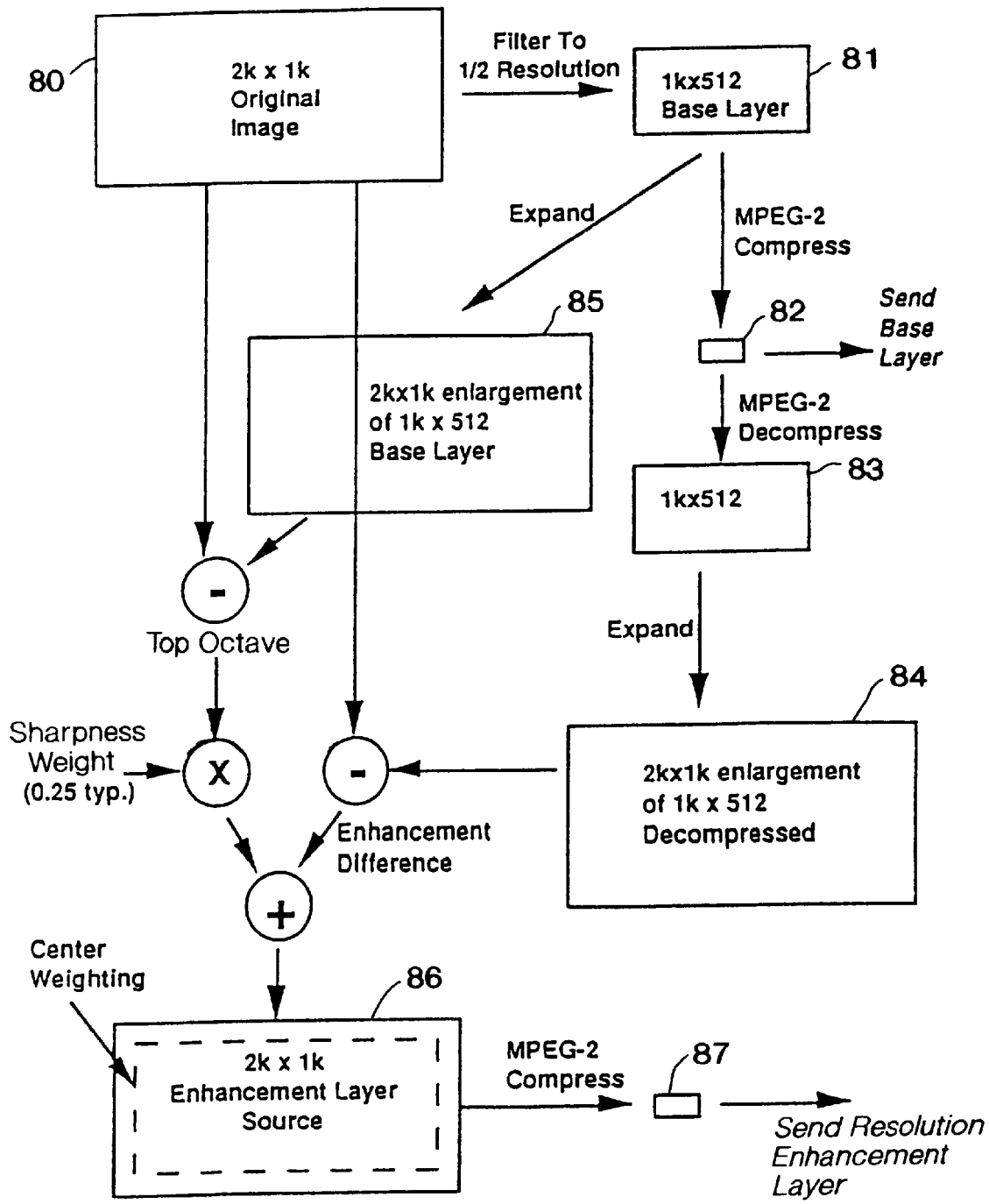
FIG. 8 is a diagram showing the preferred layered resolution encoding process.
Figure 9:
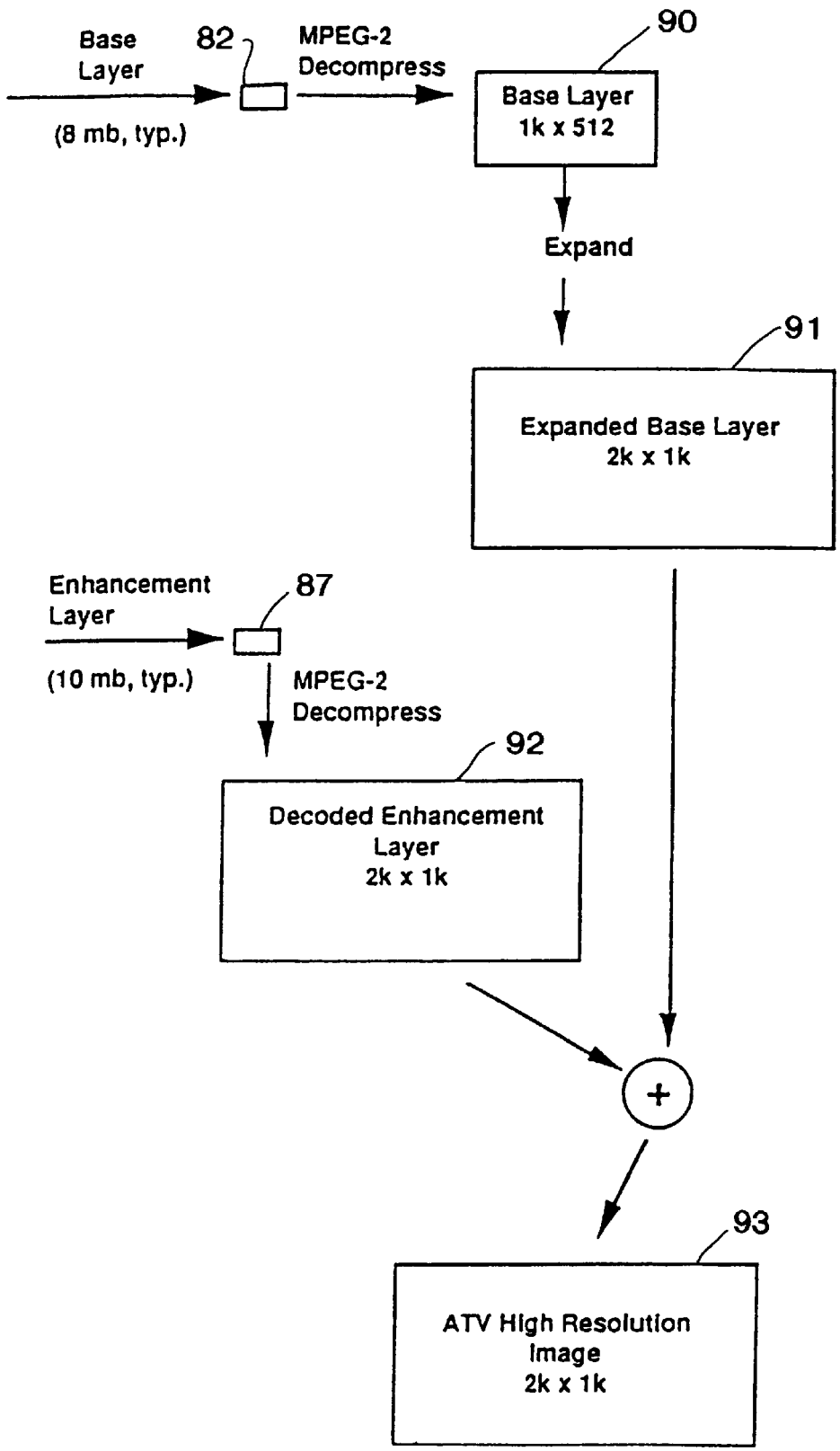
FIG. 9 is a diagram showing the preferred layered resolution decoding process.

The process of resolution enhancement can be achieved by generating a resolution enhancement layer as an independent MPEG-2 stream and applying MPEG-2 compression to the enhancement layer. This technique differs from the "spatial scalability" defined with MPEG-2, which has proven to be highly inefficient. However, MPEG-2 contains all of the tools to construct an effective layered resolution to provide spatial scalability. The preferred layered resolution encoding process of the present invention is shown in FIG. 8. The preferred decoding process of the present invention is shown in FIG. 9.

Resolution Layer Coding. In FIG. 8, an original 2k×1k image 80 is filtered in conventional fashion to ½ resolution in each dimension to create a 1024×512 base layer 81. The base layer 81 is then compressed according to conventional MPEG-2 algorithms, generating an MPEG-2 base layer 82 suitable for transmission. Importantly, full MPEG-2 motion compensation can be used during this compression step. That same signal is then decompressed using conventional MPEG-2 algorithms back to a 1024×512 image 83. The 1024×512 image 83 is expanded (for example, by pixel replication, or preferably by better filters such as spline interpolation) to a first 2k×1k enlargement 84.

Meanwhile, as an optional step, the filtered 1024×512 base layer 81 is expanded to a second 2k×1k enlargement 85. This second 2k×1k enlargement 85 is subtracted from the original 2k×1k image 80 to generate an image that represents the top octave of resolution between the original high resolution image 80 and the original base layer image 81. The resulting image is optionally multiplied by a sharpness factor or weight, and then added to the difference between the original 2k×1k image 80 and the second 2k×1k enlargement 85 to generate a center-weighted 2k×1k enhancement layer source image 86. This enhancement layer source image 86 is then compressed according to conventional MPEG-2 algorithms, generating a separate MPEG-2 resolution enhancement layer 87 suitable for transmission. Importantly, full MPEG-2 motion compensation can be used during this compression step.

Resolution Layer Decoding. In FIG. 9, the base layer 82 is decompressed using conventional MPEG-2 algorithms back to a 1024×512 image 90. The 1024×512 image 90 is expanded to a first 2k×1k image 91. Meanwhile, the resolution enhancement layer 87 is decompressed using conventional MPEG-2 algorithms back to a second 2k×1k image 92. The first 2k×1k image 91 and the second 2k×1k image 92 are then added to generate a high-resolution 2k×1k image 93.

Improvements Over MPEG-2. In essence, the enhancement layer is created by expanding the decoded base layer, taking the difference between the original image and the decoded base layer, and compressing. However, a compressed resolution enhancement layer may be optionally added to the base layer after decoding to create a higher resolution image in the decoder. The inventive layered resolution encoding process differs from MPEG-2 spatial scalability in several ways:

- The enhancement layer difference picture is compressed as its own MPEG-2 data stream, with I, B, and P frames. This difference represents the major reason that resolution scalability, as proposed here, is effective, where MPEG-2 spatial scalability is ineffective. The spatial scalability defined within MPEG-2 allows an upper layer to be coded as the difference between the upper layer picture and the expanded base layer, or as a motion compensated MPEG-2 data stream of the actual picture, or a combination of both. However, neither of these encodings is efficient. The difference from the base layer could be considered as an I frame of the difference, which is inefficient compared to a motion-compensated difference picture, as in the present invention. The upper-layer encoding defined within MPEG-2 is also inefficient, since it is identical to a complete encoding of the upper layer. The motion compensated encoding of the difference picture, as in the present invention, is therefore substantially more efficient.
- Since the enhancement layer is an independent MPEG-2 data stream, the MPEG-2 systems transport layer (or another similar mechanism) must be used to multiplex the base layer and enhancement layer.
- The expansion and resolution reduction filtering can be a gaussian or spline function, which are more optimal than the bilinear interpolation specified in MPEG-2 spatial scalability.
- The image aspect ratio must match between the lower and higher layers in the preferred embodiment. In MPEG-2 spatial scalability, extensions to width and/or height are allowed. Such extensions are not allowed in the preferred embodiment due to efficiency requirements.
- Due to efficiency requirements, and the extreme amounts of compression used in the enhancement layer, the entire area of the enhancement layer is not coded. Usually, the area excluded from enhancement will be the border area. Thus, the 2k×1k enhancement layer source image 86 in the preferred embodiment is center-weighted. In the preferred embodiment, a fading function (such as linear weighting) is used to "feather" the enhancement layer toward the center of the image and away from the border edge to avoid abrupt transitions in the image. Moreover, any manual or automatic method of determining regions having detail which the eye will follow can be utilized to select regions which need detail, and to exclude regions where extra detail is not required. All of the image has detail to the level of the base layer, so all of the image is present. Only the areas of special interest benefit from the enhancement layer. In the absence of other criteria, the edges or borders of the frame can be excluded from enhancement, as in the center-weighted embodiment described above. The MPEG-2 parameters "lower_layer_prediction_horizontal&vertical offset" parameters used as signed negative integers, combined with the "horizontal&vertical_subsampling_factor_m&n" values, can be used to specify the enhancement layer rectangle's overall size and placement within the expanded base layer.

A sharpness factor is added to the enhancement layer to offset the loss of sharpness which occurs during quantization. Care must be taken to utilize this parameter only to restore the clarity and sharpness of the original picture, and not to enhance the image. As noted above with respect to FIG. 8, the sharpness factor is the "high octave" of resolution between the original high resolution image 80 and the original base layer image 81 (after expansion). This high octave image will be quite noisy, in addition to containing the sharpness and detail of the high octave of resolution. Adding too much of this image can yield instability in the motion compensated encoding of the enhancement layer. The amount that should be added depends upon the level of the noise in the original image. A typical weighting value is 0.25. For noisy images, no sharpness should be added, and it even may be advisable to suppress the noise in the original for the enhancement layer before compressing using conventional noise suppression techniques which preserve detail.

Temporal and resolution scalability are intermixed by utilizing B frames for temporal enhancement from 36 to 72 Hz in both the base and resolution enhancement layers. In this way, four possible levels of decoding performance are possible with two layers of resolution scalability, due to the options available with two levels of temporal scalability.

These differences represent substantial improvements over MPEG-2 spatial and temporal scalability. However, these differences are still consistent with MPEG-2 decoder chips, although additional logic may be required in the decoder to perform the expansion and addition in the resolution enhancement decoding process shown in FIG. 9. Such additional logic is nearly identical to that required by the less effective MPEG-2 spatial scalability.

Optional Non-MPEG-2 Coding of the Resolution Enhancement Layer. It is possible to utilize a different compression technique for the resolution enhancement layer than MPEG-2. Further, it is not necessary to utilize the same compression technology for the resolution enhancement layer as for the base layer. For example, motion-compensated block wavelets can be utilized to match and track details with great efficiency when the difference layer is coded. Even if the most efficient position for placement of wavelets jumps around on the screen due to changing amounts of differences, it would not be noticed in the low-amplitude enhancement layer. Further, it is not necessary to cover the entire image—it is only necessary to place the wavelets on details. The wavelets can have their placement guided by detail regions in the image. The placement can also be biased away from the edge.

Multiple Resolution Enhancement Layers. At the bit rates being described here, where 2 MPixels (2048×1024) at 72 frames per second are being coded in 18.5 mbits/second, only a base layer (1024×512 at 72fps) and a single resolution enhancement layer have been successfillly demonstrated. However, the anticipated improved efficiencies available from further refinement of resolution enhancement layer coding should allow for multiple resolution enhancement layers. For example, it is conceivable that a base layer at 512×256 could be resolution-enhanced by four layers to 1024×512, 1536×768, and 2048×1024. This is possible with existing MPEG-2 coding at the movie frame rate of 24 frames per second. At high frame rates such as 72 frames per second, MPEG-2 does not provide sufficient efficiency in the coding of resolution-enhancement layers to allow this many layers at present.

Mastering Formats

Utilizing a template at or near 2048×1024 pixels, it is possible to create a single digital moving image master format source for a variety of release formats. As shown in FIG. 6, a 2k×1k template can efficiently support the common widescreen aspect ratios of 1.85:1 and 2.35:1. A 2k×1k template can also accommodate 1.33:1 and other aspect ratios.

Although integers (especially the factor of 2) and simple fractions (⅔ & ⅓) are most efficient step sizes in resolution layering, it is also possible to use arbitrary ratios to achieve any required resolution layering. However, using a 2048×1024 template, or something near it, provides not only a high quality digital master format, but also can provide many other convenient resolutions from a factor of two base layer (1k×512), including NTSC, the U.S. television standard.

It is also possible to scan film at higher resolutions such as 4k×2k, 4k×3k, or 4k×4k. Using optional resolution enhancement, these higher resolutions can be created from a central master format resolution near 2k×1k. Such enhancement layers for film will consist of both image detail, grain, and other sources of noise (such as scanner noise). Because of this noisiness, the use of compression technology in the enhancement layer for these very high resolutions will require alternatives to MPEG-2 types of compression. Fortunately, other compression technologies exist which can be utilized for compressing such noisy signals, while still maintaining the desired detail in the image. One example of such a compression technology is motion compensated wavelets or motion compensated fractals.

Preferably, digital mastering formats should be created in the frame rate of the film if from existing movies (i.e., at 24 frames per second). The common use of both 3-2 pulldown and interlace would be inappropriate for digital film masters. For new digital electronic material, it is hoped that the use of 60 Hz interlace will cease in the near future, and be replaced by frame rates which are more compatible with computers, such as 72 Hz, as proposed here. The digital image masters should be made at whatever frame rate the images are captured, whether at 72 Hz, 60 Hz, 36 Hz, 37.5 Hz, 75 Hz, 50 Hz, or other rates.

The concept of a mastering format as a single digital source picture format for all electronic release formats differs from existing practices, where PAL, NTSC, letterbox, pan-and-scan, HDTV, and other masters are all generally independently made from a film original. The use of a mastering format allows both film and digital/electronic shows to be mastered once, for release on a variety of resolutions and formats.

Combined Resolution and Temporal Enhancement Layers

As noted above, both temporal and resolution enhancement layering can be combined. Temporal enhancement is provided by decoding B frames. The resolution enhancement layer also has two temporal layers, and thus also contains B frames.

For 24 fps film, the most efficient and lowest cost decoders might use only P frames, thereby minimizing both memory and memory bandwidth, as well as simplifying the decoder by eliminating B frame decoding. Thus, in accordance with the present invention, decoding movies at 24 fps and decoding advanced television at 36 fps could utilize a decoder without B frame capability. B frames can then be utilized between P frames to yield the higher temporal layer at 72 Hz, as shown in FIG. 3, which could be decoded by a second decoder. This second decoder could also be simplified, since it would only have to decode B frames.

Such layering also applies to the enhanced resolution layer, which can similarly utilize only P and I frames for 24 and 36 fps rates. The resolution enhancement layer can add the full temporal rate of 72 Hz at high resolution by adding B frame decoding within the resolution enhancement layer.

Figure 10:
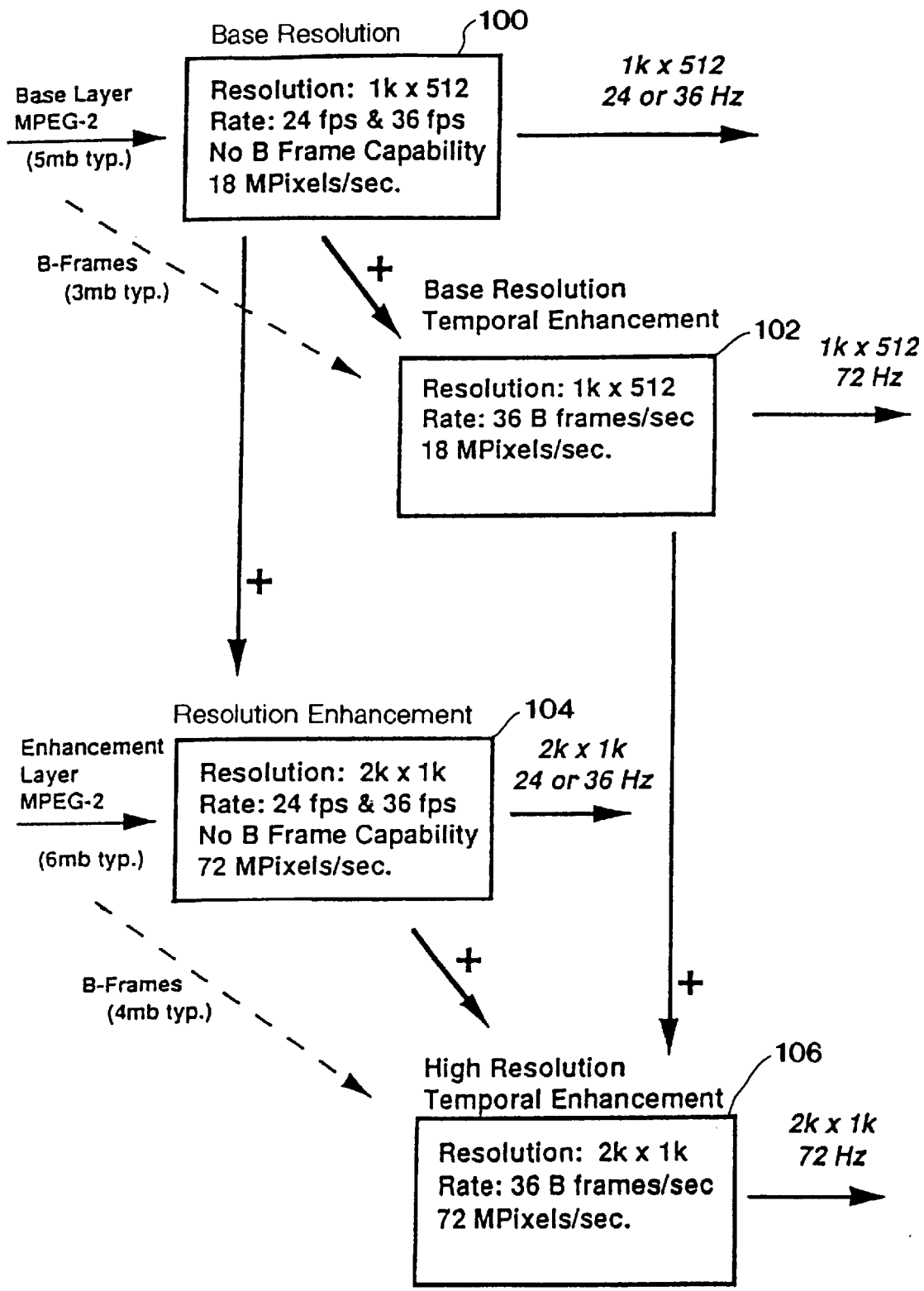
FIG. 10 is a block diagram showing a combination of resolution and temporal scalable options for a decoder in accordance with the present invention.

The combined resolution and temporal scalable options for a decoder are illustrated in FIG. 10. This example also shows an allocation of the proportions of an approximately 18 mbit/second data stream to achieve the spatio-temporal layered Advanced Television of the present invention.

In FIG. 10, a base layer MPEG-2 1024×512 pixel data stream (comprising only P frames in the preferred embodiment) is applied to a base resolution decoder 100. Approximately 5 mbits/per sec of bandwidth is required for the P frames. The base resolution decoder 100 can decode at 24 or 36 fps. The output of the base resolution decoder 100 comprises low resolution, low frame rate images (1024×512 pixels at 24 or 36 Hz).

The B frames from the same data stream are parsed out and applied to a base resolution temporal enhancement layer decoder 102. Approximately 3 mbits/per sec of bandwidth is required for such B frames. The output of the base resolution decoder 100 is also coupled to the temporal enhancement layer decoder 102. The temporal enhancement layer decoder 102 can decode at 36 fps. The combined output of the temporal enhancement layer decoder 102 comprises low resolution, high frame rate images (1024×512 pixels at 72 Hz).

Also in FIG. 10, a resolution enhancement layer MPEG-2 2k×1k pixel data stream (comprising only P frames in the preferred embodiment) is applied to a base temporal high resolution enhancement layer decoder 104. Approximately 6 mbits/per sec of bandwidth is required for the P frames. The output of the base resolution decoder 100 is also coupled to the high resolution enhancement layer decoder 104. The high resolution enhancement layer decoder 104 can decode at 24 or 36 fps. The output of the high resolution enhancement layer decoder 104 comprises high resolution, low frame rate images (2k×1k pixels at 24 or 36 Hz).

The B frames from the same data stream are parsed out and applied to a high resolution temporal enhancement layer decoder 106. Approximately 4 mbits/per sec of bandwidth is required for such B frames. The output of the high resolution enhancement layer decoder 104 is coupled to the high resolution temporal enhancement layer decoder 106. The output of the temporal enhancement layer decoder 102 is also coupled to the high resolution temporal enhancement layer decoder 106. The high resolution temporal enhancement layer decoder 106 can decode at 36 fps. The combined output of the high resolution temporal enhancement layer decoder 106 comprises high resolution, high frame rate images (2k×1k pixels at 72 Hz).

Note that the compression ratio achieved through this scalable encoding mechanism is very high, indicating excellent compression efficiency. These ratios are shown in TABLE 5 for each of the temporal and scalability options from the example in FIG. 10. These ratios are based upon source RGB pixels at 24 bits/pixel. (If the 16 bits/pixel of conventional 4:2:2 encoding or the 12 bits/pixel of conventional 4:2:0 encoding are factored in, then the compression ratios would be ¾ and ½, respectively, of the values shown.)

TABLE 5

| Layer | Resolution | Rate (Hz) | Data Rate-mb/s (typical) | MPixels/s | Comp. Ratio (typical) |
|---|---|---|---|---|---|
| Base | 1k × 512 | 36 | 5 | 18.9 | 90 |
| Base Temp. | 1k × 512 | 72 | 8 (5 + 3) | 37.7 | 113 |
| High | 2k × 1k | 36 | 11 (5 + 6) | 75.5 | 165 |
| High Temp. | 2k × 1k | 72 | 18 (5 + 3 + 6 + 4) | 151 | 201 |
| for comparison: | | | | | |
| CCIR 601 | 720 × 486 | 29.97 | 5 | 10.5 | 50 |

These high compression ratios are enabled by two factors:
1) The high temporal coherence of high-frame-rate 72 Hz images;
2) The high spatial coherence of high resolution 2k×1k images;
3) Application of resolution detail enhancement to the important parts of the image (e.g., the central heart), and not to the less important parts (e.g., the borders of the frame).

These factors are exploited in the inventive layered compression technique by taking advantage of the strengths of the MPEG-2 encoding syntax. These strengths include bi-directionally interpolated B frames for temporal scalability. The MPEG-2 syntax also provides efficient motion representation through the use of motion-vectors in both the base and enhancement layers. Up to some threshold of high noise and rapid image change, MPEG-2 is also efficient at coding details instead of noise within an enhancement layer through motion compensation in conjunction with DCT quantization. Above this threshold, the data bandwidth is best allocated to the base layer. These MPEG-2 mechanisms work together when used according to the present invention to yield highly efficient and effective coding which is both temporally and spatially scalable.

In comparison to 5 mbit/second encoding of CCIR 601 digital video, the compression ratios in TABLE 5 are much higher. One reason for this is the loss of some coherence due to interlace. Interlace negatively affects both the ability to predict subsequent frames and fields, as well as the correlation between vertically adjacent pixels. Thus, a major portion of the gain in compression efficiency described here is due to the absence of interlace. The large compression ratios achieved by the present invention can be considered from the perspective of the number of bits available to code each MPEG-2 macroblock. As noted above, macroblock is a 16×16 pixel grouping of four 8×8 DCT blocks, together with one motion vector for P frames, and one or two motion vectors for B frames. The bits available per macroblock for each layer are shown in TABLE 6.

TABLE 6

| Layer | Data Rate-mb/s (typical) | MPixels/s | Average Available Bits/Macroblk |
|---|---|---|---|
| Base | 5 | 19 | 68 |
| Base Temporal | 8 (5 + 3) | 38 | 54 |
| High | 11 (5 + 6) | 76 | 37 overall, 20/enh. layer |
| High w/border around hi-res center | 11 (5 + 6) | 61 | 46 overall, 35/enh. layer |
| High Temporal | 18 (5 + 3 + 6 + 4) | 151 | 30 overall, 17/enh. layer |
| High Temporal w/border around hi-res center | 18 (5 + 3 + 6 + 4) | 123 | 37 overall, 30/enh. layer |
| for comparison: | | | |
| CCIR 601 | 5 | 10.5 | 122 |

The available number of bits to code each macroblock is smaller in the enhancement layer than in the base layer. This is appropriate, since it is desirable for the base layer to have as much quality as possible. The motion vector requires 8 bits or so, leaving 10 to 25 bits for the macroblock type codes and for the DC and AC coefficients for all four 8×8 DCT blocks. This leaves room for only a few "strategic" AC coefficients. Thus, statistically, most of the information available for each macroblock must come from the previous frame of an enhancement layer.

It is easily seen why the MPEG-2 spatial scalability is ineffective at these compression ratios, since there is not sufficient data space available to code enough DC and AC coefficients to represent the high octave of detail represented by the enhancement difference image. The high octave is represented primarily in the fifth through eighth horizontal and vertical AC coefficients. These coefficients cannot be reached if there are only a few bits available per DCT block.

The system described here gains its efficiency by utilizing motion compensated prediction from the previous enhancement difference frame. This is demonstrably effective in providing excellent results in temporal and resolution (spatial) layered encoding.

Graceful Degradation The temporal scaling and resolution scaling techniques described here work well for normal-running material at 72 frames per second using a 2k×1k original source. These techniques also work well on film-based material which runs at 24 fps. At high frame rates, however, when a very noise-like image is coded, or when there are numerous shot cuts within an image stream, the enhancement layers may lose the coherence between frames which is necessary for effective coding. Such loss is easily detected, since the buffer-fullness/rate-control mechanism of a typical MPEG-2 encoder/decoder will attempt to set the quantizer to very coarse settings. When this condition is encountered, all of the bits normally used to encode the resolution enhancement layers can be allocated to the base layer, since the base layer will need as many bits as possible in order to code the stressful material. For example, at between about 0.5 and 0.33 MPixels per frame for the base layer, at 72 frames per second, the resultant pixel rate will be 24 to 36 MPixels/second. Applying all of the available bits to the base layer provides about 0.5 to 0.67 million additional bits per frame at 18.5 mbits/second, which should be sufficient to code very well, even on stressful material.

Under more extreme cases, where every frame is very noise-like and/or there are cuts happening every few frames, it is possible to gracefully degrade even further without loss of resolution in the base layer. This can be done by removing the B frames coding the temporal enhancement layer, and thus allow use of all of the available bandwidth (bits) for the I and P frames of the base layer at 36 fps. This increases the amount of data available for each base layer frame to between about 1.0 and 1.5 mbits/frame (depending on the resolution of the base layer). This will still yield the fairly good motion rendition rate of 36 fps at the fairly high quality resolution of the base layer, under what would be extremely stressful coding conditions. However, if the base-layer quantizer is still operating at a coarse level under about 18.5 mbits/second at 36 fps, then the base layer frame rate can be dynamically reduced to 24, 18, or even 12 frames per second (which would make available between 1.5 and 4 mbits for every frame), which should be able to handle even the most pathological moving image types. Methods for changing frame rate in such circumstances are known in the art.

The current proposal for U.S. advanced television does not allow for these methods of graceful degradation, and therefore cannot perform as well on stressful material as the inventive system.

In most MPEG-2 encoders, the adaptive quantization level is controlled by the output buffer fullness. At the high compression ratios involved in the resolution enhancement layer of the present invention, this mechanism may not function optimally. Various techniques can be used to optimize the allocation of data to the most appropriate image regions. The conceptually simplest technique is to perform a pre-pass of encoding over the resolution enhancement layer to gather statistics and to search out details which should be preserved. The results from the pre-pass can be used to set the adaptive quantization to optimize the preservation of detail in the resolution enhancement layer. The settings can also be artificially biased to be non-uniform over the image, such that image detail is biased to allocation in the main screen regions, and away from the macroblocks at the extreme edges of the frame.

Except for leaving an enhancement-layer border at high frame rates, none of these adjustments are required, since existing decoders function well without such improvements. However, these further improvements are available with a small extra effort in the enhancement layer encoder.

Conclusion

The choice of 36 Hz as a new common ground temporal rate appears to be optimal. Demonstrations of the use of this frame rate indicate that it provides significant improvement over 24 Hz for both 60 Hz and 72 Hz displays. Images at 36 Hz can be created by utilizing every other frame from 72 Hz image capture. This allows combining a base layer at 36 Hz (preferably using P frames) and a temporal enhancement layer at 36 Hz (using B frames) to achieve a 72 Hz display.

The "future-looking" rate of 72 Hz is not compromised by the inventive approach, while providing transition for 60 Hz analog NTSC display. The invention also allows a transition for other 60 Hz displays, if other passive-entertainment-only (computer incompatible) 60 Hz formats under consideration are accepted.

Resolution scalability can be achieved though using a separate MPEG-2 image data stream for a resolution enhancement layer. Resolution scalability can take advantage of the B frame approach to provide temporal scalability in both the base resolution and enhancement resolution layers.

The invention described here achieves many highly desirable features. It has been claimed by some involved in the U.S. advanced television process that neither resolution nor temporal scalability can be achieved at high definition resolutions within the approximately 18.5 mbits/second available in terrestrial broadcast. However, the present invention achieves both temporal and spatial-resolution scalability within this available data rate.

It has also been claimed that 2 MPixels at high frame rates cannot be achieved without the use of interlace within the available 18.5 mbit/second data rate. However, achieves not only resolution (spatial) and temporal scalability, it can provide 2 MPixels at 72 frames per second.

In addition to providing these capabilities, the present invention is also very robust, particularly compared to the current proposal for advanced television. This is made possible by the allocation of most or all of the bits to the base layer when very stressful image material is encountered. Such stressful material is by its nature both noise-like and very rapidly changing. In these circumstances, the eye cannot see detail associated with the enhancement layer of resolution. Since the bits are applied to the base layer, the reproduced frames are substantially more accurate than the currently proposed advanced television system, which uses a single constant higher resolution.

Thus, the inventive system optimizes both perceptual and coding efficiency, while providing maximum visual impact. This system provides a very clean image at a resolution and frame rate performance that had been considered by many to be impossible. It is believed that the inventive system is likely to outperform the advanced television formats being proposed by ACATS. In addition to this anticipated superior performance, the present invention also provides the highly valuable features of temporal and resolution layering.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programmning language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, while the preferred embodiment uses MPEG-2 coding and decoding, the invention will work with any comparable standard that provides equivalents of B frames, P frames, and layers. Further, small deviations (less than one Hz) from the precise frequencies and framing rates given above generally would not significantly impact the present invention. Accordingly, it is to be understood that the invention is not to be limited by the specific illustrated embodiment, but only by the scope of the appended claims.

What is claimed is:

1. A method for capturing and compressing video information, comprising the steps of:

(a) capturing video images in a plurality of frames at an initial framing rate selected from one of approximately 36 fps, 72 fps, and 75 fps;

(b) encoding the captured video images in a compressed data stream comprising:

(1) a base layer comprising an encoded bitstream having relatively low resolution and a frame rate selected from one of approximately 24 Hz, 36 Hz, and 37.5 Hz;

(2) at least one of the following types of layers:

(A) optionally, at least one temporal enhancement layer comprising an encoded bitstream having relatively low resolution and a frame rate selected to achieve a final frame rate of approximately 60 Hz, 72 Hz, or 75 Hz when combined with the base layer;

(B) optionally, at least one high resolution enhancement layer comprising an encoded bitstream having relatively high resolution and a frame rate selected from one of approximately 24 Hz, 36 Hz, and 37.5 Hz;

(C) optionally, at least one high resolution temporal enhancement layer comprising an encoded bitstream having relatively high resolution and a frame rate selected from and a frame rate selected to achieve a final frame rate of approximately 60 Hz, 72 Hz, or 75 Hz when combined with the high resolution enhancement layers.

* * * * *